US012794809B2

(12) United States Patent
Nadahalli et al.

(10) Patent No.: US 12,794,809 B2
(45) Date of Patent: Nov. 10, 2026

(54) BI-DIRECTIONAL ASSOCIATIVITY-BASED PACKET STEERING FOR OPTIMAL PACKET PROCESSING IN VIRTUAL NETWORK FUNCTION

(71) Applicant: Advanced Micro Devices, Inc., Santa Clara, CA (US)

(72) Inventors: Akshaya Nadahalli, Bengaluru (IN); Bhuvan Mital, Bangalore (IN); Deepti Bomma, Bangalore (IN); John Cruz, Santa Clara, CA (US); Sarat Babu Kamisetty, Fremont, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 283 days.

(21) Appl. No.: 18/619,093

(22) Filed: Mar. 27, 2024

(65) Prior Publication Data

US 2025/0310262 A1 Oct. 2, 2025

(51) Int. Cl.
*H04L 47/125* (2022.01)
*H04L 47/625* (2022.01)

(52) U.S. Cl.
CPC .......... *H04L 47/125* (2013.01); *H04L 47/625* (2013.01)

(58) Field of Classification Search
CPC .. H04L 47/125; H04L 47/625; H04L 45/7453
See application file for complete search history.

(56) References Cited

U.S. PATENT DOCUMENTS

| | | | | |
|---|---|---|---|---|
| 9,203,776 | B2 * | 12/2015 | Ehara | H04L 45/42 |
| 10,630,644 | B2 * | 4/2020 | Shah | H04L 63/0263 |
| 11,483,261 | B2 * | 10/2022 | Li | H04L 47/745 |
| 11,875,839 | B2 * | 1/2024 | Friedman | G06F 12/063 |
| 2014/0036673 | A1 * | 2/2014 | Ehara | H04L 45/302 370/230.1 |
| 2014/0269750 | A1 * | 9/2014 | Tsirkin | H04L 49/70 370/413 |
| 2018/0054386 | A1 * | 2/2018 | Lee | H04L 45/021 |
| 2018/0176183 | A1 * | 6/2018 | Shah | H04L 63/0254 |
| 2018/0322913 | A1 * | 11/2018 | Friedman | G06F 12/063 |
| 2025/0106149 | A1 * | 3/2025 | Shah | H04L 45/566 |
| 2025/0106150 | A1 * | 3/2025 | Shah | H04L 45/566 |
| 2025/0310262 | A1 * | 10/2025 | Nadahalli | H04L 47/125 |

FOREIGN PATENT DOCUMENTS

| | | | | |
|---|---|---|---|---|
| EP | 2916613 B1 * | 9/2018 | | H04W 72/52 |
| WO | WO-2021014204 A1 * | 1/2021 | | H04L 63/0428 |

* cited by examiner

*Primary Examiner* — Jay P Patel

(74) *Attorney, Agent, or Firm* — Patterson + Sheridan, LLP

(57) ABSTRACT

A method performed by a network Input/Output (I/O) device includes, when an outgoing packet is transmitted on a TX queue by a CPU core to the network I/O device, performing a flow-based lookup in an initiator flow table and a reverse flow table stored in the network I/O device to match N-tuples of the outgoing packet. When a matching flow entry is found based on the values of the N-tuples, the method determines whether an RX queue ID stored in the flow entry is pinned to a TX queue ID of the TX queue on which the outgoing packet is transmitted. When the RX queue ID is not pinned to the TX queue ID, the method updates the RX queue ID and the TX queue ID in the initiator and reverse flow tables such that the updated RX queue ID is pinned to the TX queue ID.

20 Claims, 7 Drawing Sheets

142A

| Initiator Flow Entry | N-Tuples | | | | | TX Queue ID | RX Queue ID |
|---|---|---|---|---|---|---|---|
| | Source IP Address | Source Port | Destination IP Address | Destination Port | Protocol | | |
| 3002 | 1.1.1.1 | 1000 | 2.2.2.2 | 2000 | TCP/UDP | TX0 | RX0 |
| ... | ... | ... | ... | ... | ... | ... | ... |
| 3008 | 1.1.1.1 | 1000 | 3.3.3.3 | 3000 | TCP/UDP | TX0 | RX0 |

FIG. 3A

142B

| Reverse Flow Entry | N-Tuples | | | | | TX Queue ID | RX Queue ID |
|---|---|---|---|---|---|---|---|
| | Source IP Address | Source Port | Destination IP Address | Destination Port | Protocol | | |
| 3102 | 2.2.2.2 | 2000 | 1.1.1.1 | 1000 | TCP/UDP | TX0 | RX0 |
| ... | ... | ... | ... | ... | ... | ... | ... |
| 3108 | 3.3.3.3 | 3000 | 1.1.1.1 | 1000 | TCP/UDP | TX0 | RX0 |

FIG. 3B

144

| TX Queue ID | RX Queue ID |
|---|---|
| TX0 | RX0 |
| TX1 | RX1 |
| TX2 | RX2 |
| • • • | • • • |
| TXn | RXn |

FIG. 4

BI-DIRECTIONAL ASSOCIATIVITY-BASED PACKET STEERING FOR OPTIMAL PACKET PROCESSING IN VIRTUAL NETWORK FUNCTION

TECHNICAL FIELD

Examples of the present disclosure generally relate to network traffic optimization, and in particular to bi-directional associativity-based packet steering for optimal packet processing in Virtual Network Function (VNF).

BACKGROUND

VNFs are software based virtualized network services running on open computing platforms. Common VNFs include router, firewall, load balancing, and network address translation (NAT) services, which may involve storing stateful information at a packet flow level. VNF software may run on multiple central processing unit (CPU) cores and utilize hashing algorithms, such as Receive Side Scaling (RSS), implemented in a network input/output (I/O) device (e.g., a network interface card (NIC), a data processing unit (DPU), or a combination thereof) to shard traffic across multiple receive (RX) queues, each of which is pinned to a CPU core. When implementing these stateful services, it is desirable for associated packets in the initiator and reverse directions (e.g., the initiator and reverse flows) to be processed by the same CPU core. However, existing hashing algorithms cannot guarantee that the initiator and reverse flows are always delivered to the same CPU core. For example, some RSS algorithms may employ asymmetric hashing techniques that can potentially assign initiator and reverse flows to different CPU cores. Even in a case where symmetric hashing is used, NAT and Network Address Port Translation (NAPT) can introduce asymmetries in packet headers that can lead to flow symmetry disruption.

Several attempts have been made at the host CPU level to correct these flow asymmetries. For example, synchronization mechanisms (e.g., locks) may be used across the CPU cores. VNF software may implement packet handoffs between CPU cores. However, these techniques can increase packet processing overhead and cause data cache misses, resulting in decreased network device performance.

Thus, solutions for improving packet processing for VNF services are desired.

SUMMARY

Systems, methods, and apparatuses are described for bi-directional associativity-based packet steering for optimal packet processing in VNF.

According to one aspect, a method performed by a network I/O device includes when an outgoing packet is transmitted on a transmit (TX) queue by a central processing unit (CPU) core to the network I/O device, performing a flow-based lookup in at least one of an initiator flow table and a reverse flow table stored in the network I/O device to match one or more values of N-tuples of the outgoing packet; in response to the one or more values of the N-tuples of the outgoing packet matching a flow entry in the initiator flow table or the reverse flow table, determining whether a receive (RX) queue ID stored in the flow entry is pinned to a TX queue ID of the TX queue on which the outgoing packet is transmitted; and in response to the RX queue ID not being pinned to the TX queue ID, updating the RX queue ID and the TX queue ID in the initiator flow table and the reverse flow table such that the updated RX queue ID is pinned to the TX queue ID of the TX queue on which the outgoing packet is transmitted by the CPU core.

According to another aspect, a programmable network I/O device including circuitry configured to, when an outgoing packet is transmitted on a transmit (TX) queue by a central processing unit (CPU) core to the programmable network I/O device, perform a flow-based lookup in at least one of an initiator flow table and a reverse flow table stored in the programmable network I/O device to match one or more values of N-tuples of the outgoing packet; in response to the one or more values of the N-tuples of the outgoing packet matching a flow entry in the initiator flow table or the reverse flow table, determine whether a receive (RX) queue ID stored in the flow entry is pinned to a TX queue ID of the TX queue on which the outgoing packet is transmitted; and in response to the RX queue ID not being pinned to the TX queue ID, update the RX queue ID and the TX queue ID in the initiator flow table and the reverse flow table such that the updated RX queue ID is pinned to the TX queue ID of the TX queue on which the outgoing packet is transmitted by the CPU core.

According to yet another aspect, a network device includes a host CPU comprising a plurality of CPU cores; and a network input/output (I/O) device communicatively coupled to the host CPU through a host interface. The network I/O device including circuitry configured to, when an outgoing packet is transmitted on a transmit (TX) queue by a central processing unit (CPU) core to the network I/O device, perform a flow-based lookup in at least one of an initiator flow table and a reverse flow table stored in the network I/O device to match one or more values of N-tuples of the outgoing packet; in response to the one or more values of the N-tuples of the outgoing packet matching a flow entry in the initiator flow table or the reverse flow table, determine whether a receive (RX) queue ID stored in the flow entry is pinned to a TX queue ID of the TX queue on which the outgoing packet is transmitted; and in response to the RX queue ID not being pinned to the TX queue ID, update the RX queue ID and the TX queue ID in the initiator flow table and the reverse flow table such that the updated RX queue ID is pinned to the TX queue ID of the TX queue on which the outgoing packet is transmitted by the CPU core.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 3A and 3B illustrate an initiator flow table and a reverse flow table, respectively, in accordance with example embodiments of the present disclosure.

FIG. 4 illustrates a transmit-receive (TX-RX) queue mapping table, in accordance with an example embodiment of the present disclosure.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
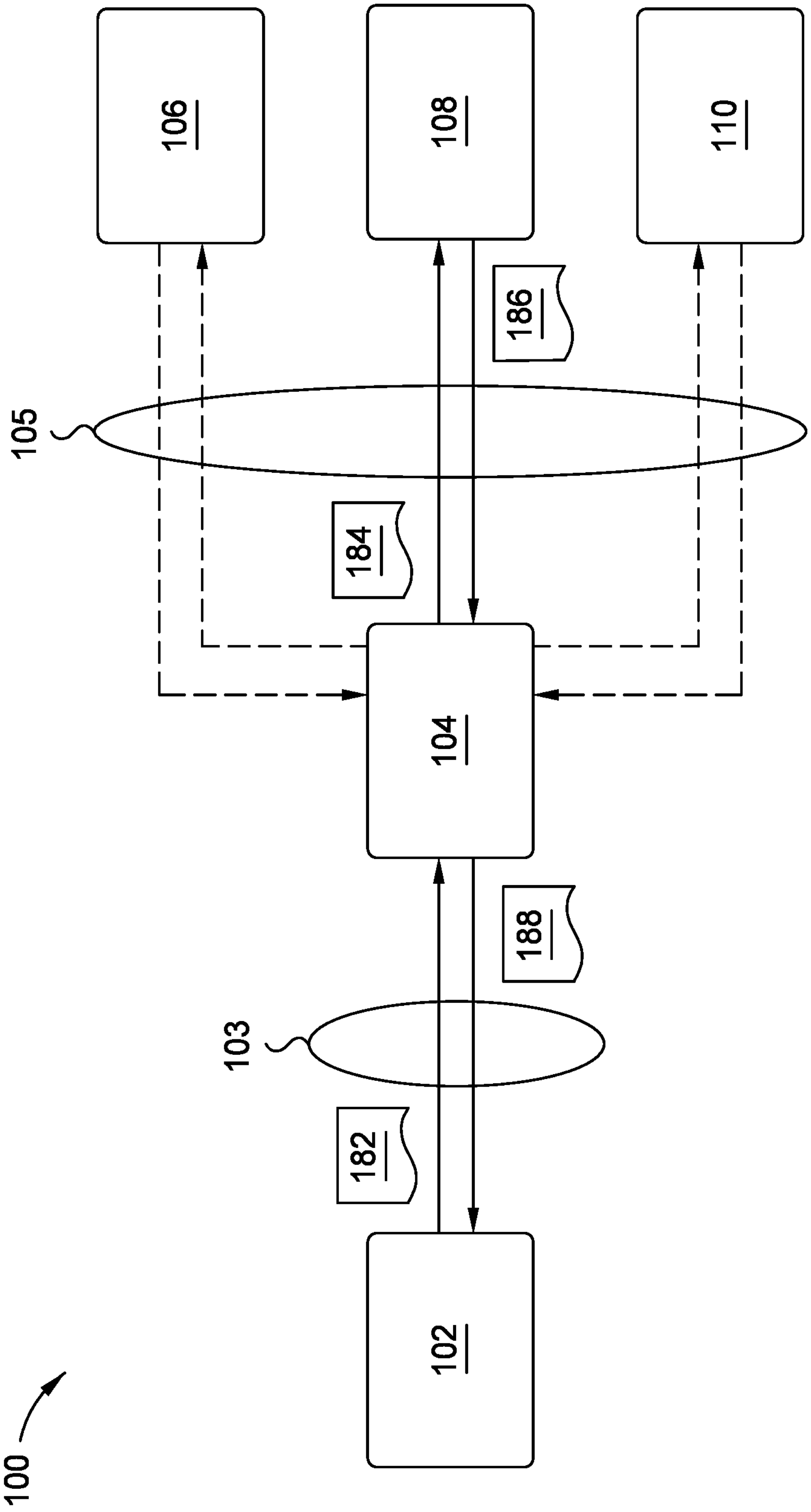
FIG. 1A illustrates a block diagram of a network environment, in accordance with an example embodiment of the present disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive explanation of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments of the present disclosure implement a flow-based learning in a network I/O device (e.g., a NIC, a DPU, or a combination thereof) to automatically pin the values of N-tuples of an incoming or inbound packet to a given receive (RX) queue of a CPU core. The network I/O device stores (or installs) an initiator flow table and a reverse flow table (collectively referred to as "flow tables") in a memory storage thereof, and adds or updates entries to the flow tables based on the values of N-tuples of an outgoing (or outbound) packet and a transmit (TX) queue on which the outgoing packet is transmitted by a CPU core. When an incoming (or reverse) packet returns to the network I/O device, the network I/O device steers the reverse packet to the same CPU core based on the values of the N-tuples. Hence, the initiator and reverse flows can be delivered to the same CPU core for stateful VNF services.

According to an example embodiment, when an incoming (or inbound) packet is received by the network I/O device on a front panel port, the network I/O device performs a flow based lookup in the flow tables on the N-tuples of the incoming packet. If a flow entry is found in the flow tables that matches the values of the N-tuples of the packet, then the network I/O device picks the RX queue ID cached in the matching flow entry, and steers the packet toward the RX queue based on the RX queue ID. If a matching flow entry is not found, then the network I/O device performs a flow hash (e.g., RSS) to determine which CPU core is to receive the incoming packet.

According to another embodiment, when an outgoing (or outbound) packet is transmitted on a TX queue by VNF software from a CPU core, the network I/O device performs a flow based lookup in the flow tables on the N-tuples of the packet. If a flow entry is found in the flow tables that matches the values of the N tuples of the packet, the method further determines whether the RX queue ID stored in the matching entry is matched to (e.g., paired with) the TX queue ID of the TX queue on which the packet is transmitted based on a TX-RX queue mapping table. If the matching flow entry is found, but the stored RX queue ID is pinned to a different RX queue, then the network I/O device updates the TX and RX queue IDs in both the initiator and reverse flow tables such that the RX queue is mapped to the TX queue on which the packet is transmitted. If a matching flow entry is not found, the network I/O device adds new entries in both the initiator and reverse flow tables to register the values of the N-tuples of the packet and the TX and RX queue IDs, where the RX queue is mapped to the TX queue on which the packet is transmitted.

Even when NAT or NAPT occurs in a CPU core, the embodiments of the present disclosure can install one initiator flow-reverse flow (iflow-rflow) set with pre-NAT tuple information and another iflow-rflow set installed with post-NAT tuple information. Both sets of flows are pinned to the same TX-RX queue pair. As such, the initiator and reverse flows can be delivered on the same CPU core even when NAT or NAPT is performed in the host CPU.

The embodiments of the present disclosure improve stateful handling of packet flows, and substantially eliminate the needs for employing synchronization locks across the CPU cores and implementing thread handoffs to prevent flow asymmetries. The offload pocket steering decision making and processing from the host CPU to the network I/O device and help prevent flow aging. As the TX and RX queues are pinned to the same CPU cores, and the CPU cores do not need to communicate to delete the flows. As such, packet processing performance can be improved.

FIG. 1A illustrates a block diagram of an environment 100, in accordance with an example embodiment of the present disclosure. The example environment 100 includes network devices 102, 104, 106, 108, and 110 (collectively referred to as "network devices 102-110") and networks 103 and 105.

In some embodiments, each of the network devices 102-110 may include a network host (or a host system). For example, the network devices 102-110 may each include one or more processors that execute one or more of operating system, drivers, and processes. Each processor may include one or more processor cores, such as CPU cores, to perform one or more processes. Various examples of processes executed by the processor cores may include VNFs, such as virtualized routers, firewalls, load balancing, domain name system (DNS), caching, NAT and NAPT, which can run in virtual execution environments.

In some embodiments, the networks 103 and 105 may each include a local area network (LAN), wide area network (WAN), the Internet, or a combination thereof, and connects web sites and devices and back-end systems. In some embodiments, the networks 103 and 105 may each include the Internet, an internet, and/or extranet, or an intranet and/or extranet that is in communication with the Internet. In some embodiments, the networks 103 and 105 may each include a telecommunication and/or data network. In some embodiments, each of the networks 103 and 105 can be accessed over a wired and/or a wireless communications link. For example, mobile computing devices (e.g., smartphone devices and tablet devices) can use a cellular network to access the networks 103 and 105.

In some embodiments, the network device 102 may include a computing device associated with a user. The network device 102 may facilitate the user to access the network device 104 through the network 103. For example, the network device 102 may include a desktop computer, a laptop computer, a tablet computer, a smartphone, or other suitable computing devices. The network device 104 may include a computing device that can perform one or more VNFs (e.g., virtualized routers, firewalls, load balancing, DNS, caching, NAT, and etc.). The network devices 106, 108, and 110 may each include a computing device that hosts one or more computer-implemented services with which users can interact through the network device 102. For example, each of the network devices 106, 108, and 110 may be a server device of a server system (e.g., a back-end system) that can provide services, such as a web services, to the network device 102 via the network device 104.

In one embodiment, the network device 102 may send a packet 182 to the network device 104. The network device 104 may perform a VNF to service the packet 182, and transmit a serviced packet 188 back to the network device 102.

In another embodiment, the network device 102 may send the packet 182 to the network device 104. The network device 104 may perform a VNF (e.g., as a router, a firewall, or a load balancer) to the packet 182, and decide to select another network device and transfer the packet 182 to the network device for further processing. As an example, the network device 104 may include a network load balancer that tracks the inbound network traffic from user devices (e.g., the network device 102), and distributes it across multiple service devices (e.g., the network devices 106, 108, and 110). When the network device 104 receives the packet 182 from the network device 102, the network device 104 may select one of the network devices 106, 108, and 110 for servicing or processing the packet 182 (e.g., a user/client request) from the network device 102. The network device 104 may select the network device 108, and send a packet 184 to the network device 108 (e.g., a service device or a back-end server) to perform the service requested by the network device 102. The network device 108, after performing the requested service, may transmit a packet 186 back to the network device 104, which may then transmit the packet 188 back to the network device 102.

Figure 1B:
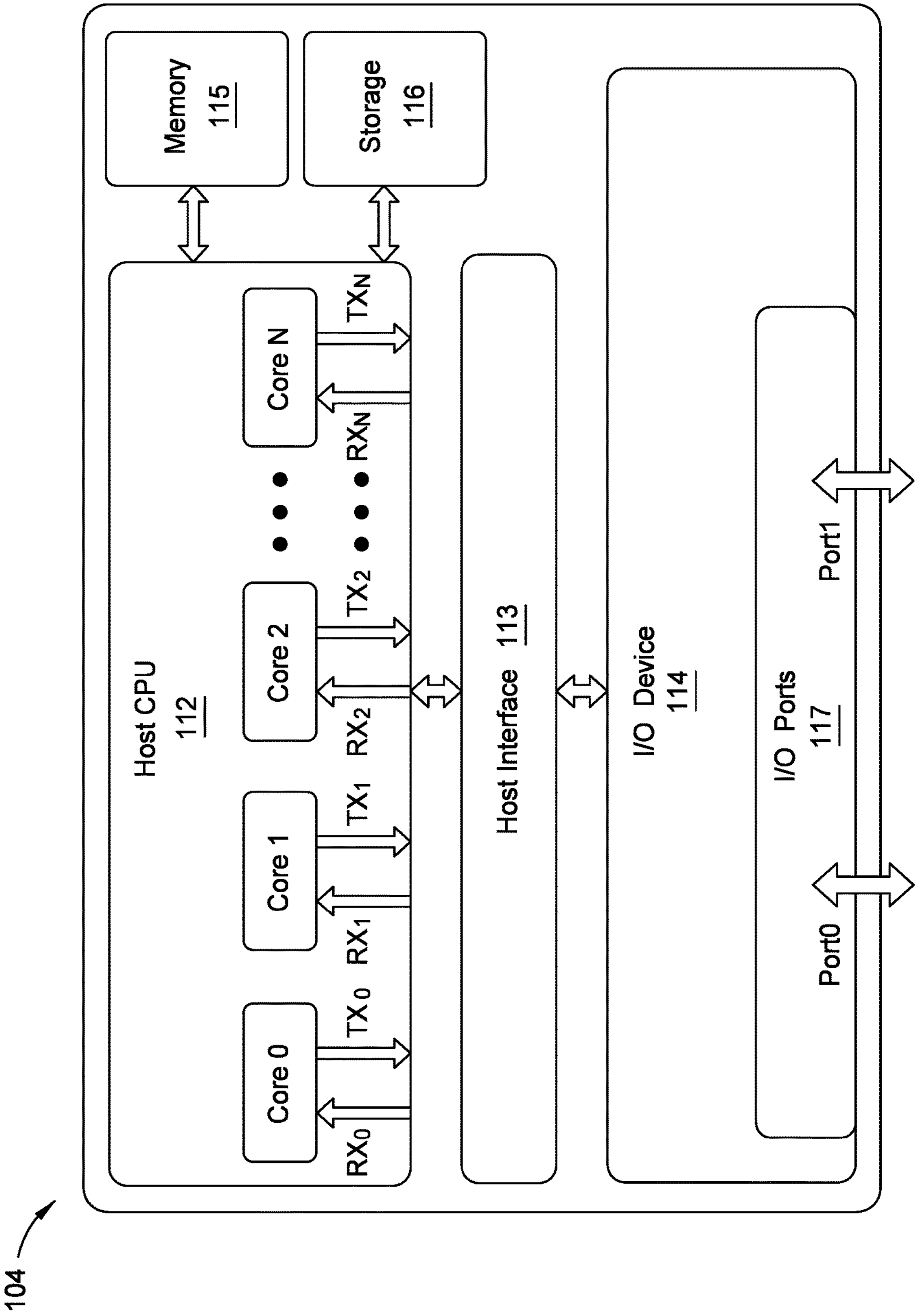
FIG. 1B illustrates a block diagram of portions of a network device in FIG. 1A, in accordance with an example embodiment of the present disclosure.

FIG. 1B illustrates a block diagram of portions of the network device 104 in FIG. 1A, in accordance with an example embodiment of the present disclosure. The network device 104 may include a computing system capable of processing and transmitting (or receiving) data packets across one or more networks (e.g., the networks 103 and 105 in FIG. 1A). The network device 104 may be programmed or configured to implement methods of the present disclosure.

As illustrated in FIG. 1B, the network device 104 includes a host CPU 112, a host interface 113, a network I/O device 114, memory 115, and an electronic storage 116.

In some embodiments, the host CPU 112 may be a multi-core processor having CPU cores 0 through N (where N is any integer greater than 1), where one or more of the CPU cores 0 through N may execute instructions (e.g., software) to provide one or more VNFs.

In some embodiments, the host CPU 112 can execute a sequence of machine-readable instructions, which can be embodied in a program or software. The instructions may be stored in a memory location, such as the memory 115. Examples of operations performed by the host CPU 112 can include, but are not limited to, fetch, decode, execute, and write back. In some embodiments, the host CPU 112 is part of a circuit, such as an integrated circuit. One or more other components of the network device 104 can be optionally included in the circuit. In some embodiments, the circuit is an ASIC or a Field Programmable Gate Array (FPGA).

In some embodiments, the host interface 113 connects the network I/O device 114 to the host CPU 112. The host interface 113 may be a peripheral component interconnect express (PCIe) interface. The host interface 113 may also be another type of serial interface, such as an RS-232, SPIU, DC-BUS, UNI/O, and 1-Wire.

In some embodiments, the network I/O device 114 may be a programmable I/O device that is connected with (e.g., communicatively coupled to) the host CPU 112 through the host interface 113. In some embodiments, the network I/O device 114 may include a NIC, a smartNIC, a DPU, a DPU-based NIC, or any combination thereof. In some embodiments, the network I/O device 114 includes a programmable ASIC engine. In some embodiments, an ASIC engine is tailored to a specific subset of functions, such as compression and checksum, while another engine is dedicated for symmetric cryptography. In some embodiments, the network I/O device 114 is configured to provide a datapath for network traffic and establish a forwarding state for the data flows.

In some embodiments, the network I/O device 114 can execute a sequence of machine-readable instructions, which can be embodied in a program or software. The instructions may be stored in a memory location of the network I/O device 114. The instructions can be directed to the network I/O device 114, which can subsequently program or otherwise configure the network I/O device 114 to implement methods of the present disclosure.

The network device 104 is operatively coupled to one or more networks (e.g., the networks 103 and 105 in FIG. 1A) through 1/O ports 117 (e.g., front panel ports 0 and 1) to receive incoming packets and transmit outgoing packets to other network devices.

In some embodiments, the network device 104 may also include one or more peripheral devices (e.g., cache, other memory, data storage or electronic display adapters) not explicitly shown. In some embodiments, the network device 104 may further include or be in communication with an electronic display (not explicitly shown) that can provide a user interface (UI).

Figure 1C:
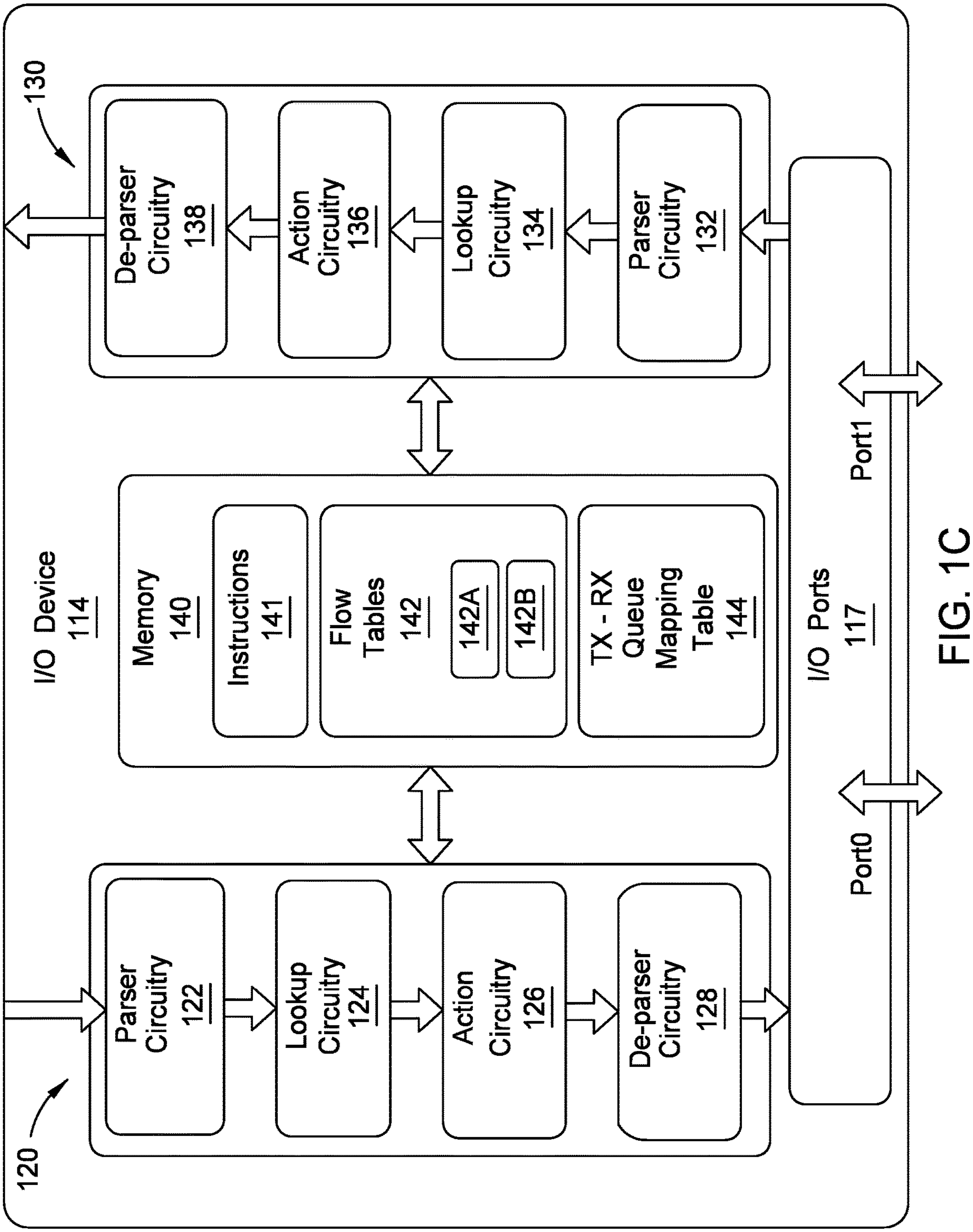
FIG. 1C illustrates a block diagram of portions of a network I/O device in FIG. 1B, in accordance with an example embodiment of the present disclosure.

FIG. 1C illustrates a block diagram of portions of the network I/O device 114 in FIG. 1B, in accordance with an example embodiment of the present disclosure. As shown in FIG. 1C, the network I/O device 114 includes egress (e.g., outgoing or outbound) pipeline circuitry 120 and ingress (e.g., incoming or inbound) pipeline circuitry 130, and memory 140 for implementing methods of the present disclosure. It should be understood that the pipeline circuitry 120 and 130 may also include buffers, multiplexers, or other suitable circuit components (not explicitly shown in FIG. 1C).

As shown in FIG. 1C, the memory 140 stores machine-executable instructions 141, flow tables 142, and a TX-RX queue mapping table 144. The machine-executable instructions 141 may each include one or more policies or rules configured by, for example, suitable software components provided by the network I/O device 114 to perform certain actions when corresponding conditions are met.

In some embodiments, the embodiments as described herein are implemented by executing the machine-executable instructions 141 stored on the memory 140. In some embodiments, the machine-executable instructions 141 may be stored on another electronic storage location of the network I/O device 114. In some embodiments, the network I/O device 114 is adapted to execute the machine-executable instructions 141. In some embodiments, the machine-executable instructions 141 are provided in the form of software. In some embodiments, during use, the code is executed by a processing unit (e.g., a DPU) of the network I/O device 114. The machine-executable instructions 141 can be pre-compiled or compiled during runtime. The machine-executable instructions 141 can be supplied in a programming language that can be selected to enable the code to execute in a pre-compiled or as-compiled fashion.

In some embodiments, the flow tables 142 includes an initiator flow table 142A and a reverse flow table 142B. In some embodiments, each of the initiator flow table 142A and the reverse flow table 142B may include multiple flow entries, where each entry may include information about values of N-tuples (where N is any integer greater than 1) of a packet, an RX queue ID, and a TX queue ID. In some examples, each flow entry may include values of 5-tuples. In some examples, the each flow entry may include values of 4-tuples, 3-tuples, 2-tuples, or 1-tuple. Even though the flow tables 142 are shown being contained in the memory 140 in the network I/O device 114 in FIG. 1C, in other embodiments, the flow tables 142 may be contained in other suitable storage locations, such as in the lookup circuitry 124 and 134 or in a storage location outside of the network I/O device 114.

As illustrated in FIG. 1C, the egress pipeline circuitry 120 includes parser circuitry 122, lookup circuitry 124, action circuitry 126, and de-parser circuitry 128. When an outgoing (outbound) packet is received at the network I/O device 114 from a host CPU (e.g., the host CPU 112 in FIG. 1B), the parser circuitry 122 may parse at least a portion of the header of the outbound packet to identify, for example, values of N-tuples of the packet. The lookup circuitry 124 may perform a lookup or matching operation to match the values of the N-tuples of the outbound packet to a flow entry in the flow tables 142 to identify one or more actions for the outbound packet, as further described with reference to FIG. 2B. The action circuitry 126 may perform one or more actions based on the lookup results from the lookup circuitry 124. The de-parser circuitry 128 may rewrite at least a portion of the header of the outbound packet according to the actions taken in the ingress pipeline circuitry 130.

As illustrated in FIG. 1C, the ingress pipeline circuitry 130 includes parser circuitry 132, lookup circuitry 134, action circuitry 136, and de-parser circuitry 138. When an incoming (or inbound) packet is received at the network I/O device 114 from a network, the parser circuitry 132 may parse at least a portion of the header of the inbound packet to identify, for example, values of N-tuples of the packet. The lookup circuitry 134 may perform a lookup or matching operation to match the values of the N-tuples of the inbound packet to a flow entry in the flow tables 142 to identify one or more actions for the inbound packet. The action circuitry 136 may perform one or more actions based on the lookup results from the lookup circuitry 134. The de-parser circuitry 138 may rewrite at least a portion of the header of the inbound packet according to the actions taken in the ingress pipeline circuitry 130.

Figure 2A:
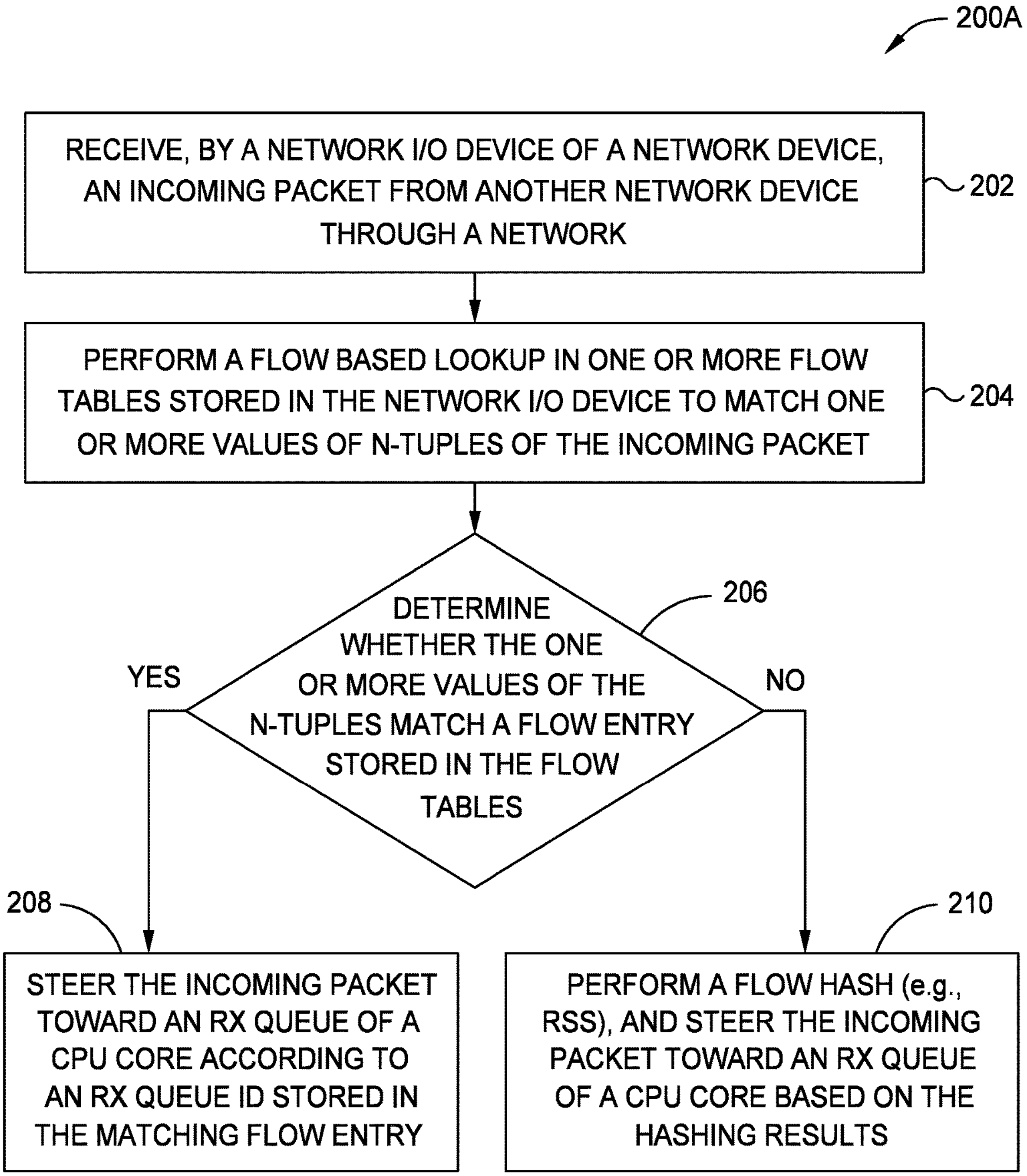
FIGS. 2A and 2B illustrate flowchart diagrams of methods performed by a network I/O device, in accordance with example embodiments of the present disclosure.

FIG. 2A illustrates a flow diagram of a method 200A performed by a network I/O device, in accordance with an embodiment of the present disclosure. At block 202, a network I/O device of a network device receives an incoming (or inbound) packet from another network device through a network. At block 204, the network I/O device performs a flow based lookup in one or more flow tables stored in the network I/O device to match one or more values of N-tuples of the incoming packet. At block 206, the network I/O device determines whether the one or more values of the N-tuples match a flow entry stored in the flow tables. At block 208, in response to a matching flow entry being found or located in the flow tables, the network I/O device steers the incoming packet toward an RX queue of a CPU core according to an RX queue ID stored in the matching flow entry. At block 210, in response to a failure to find or locate a matching flow entry in the flow tables, the network I/O device performs a flow hash (e.g., RSS), and steers the incoming packet toward an RX queue of a CPU core based on the hashing results.

Figure 2B:
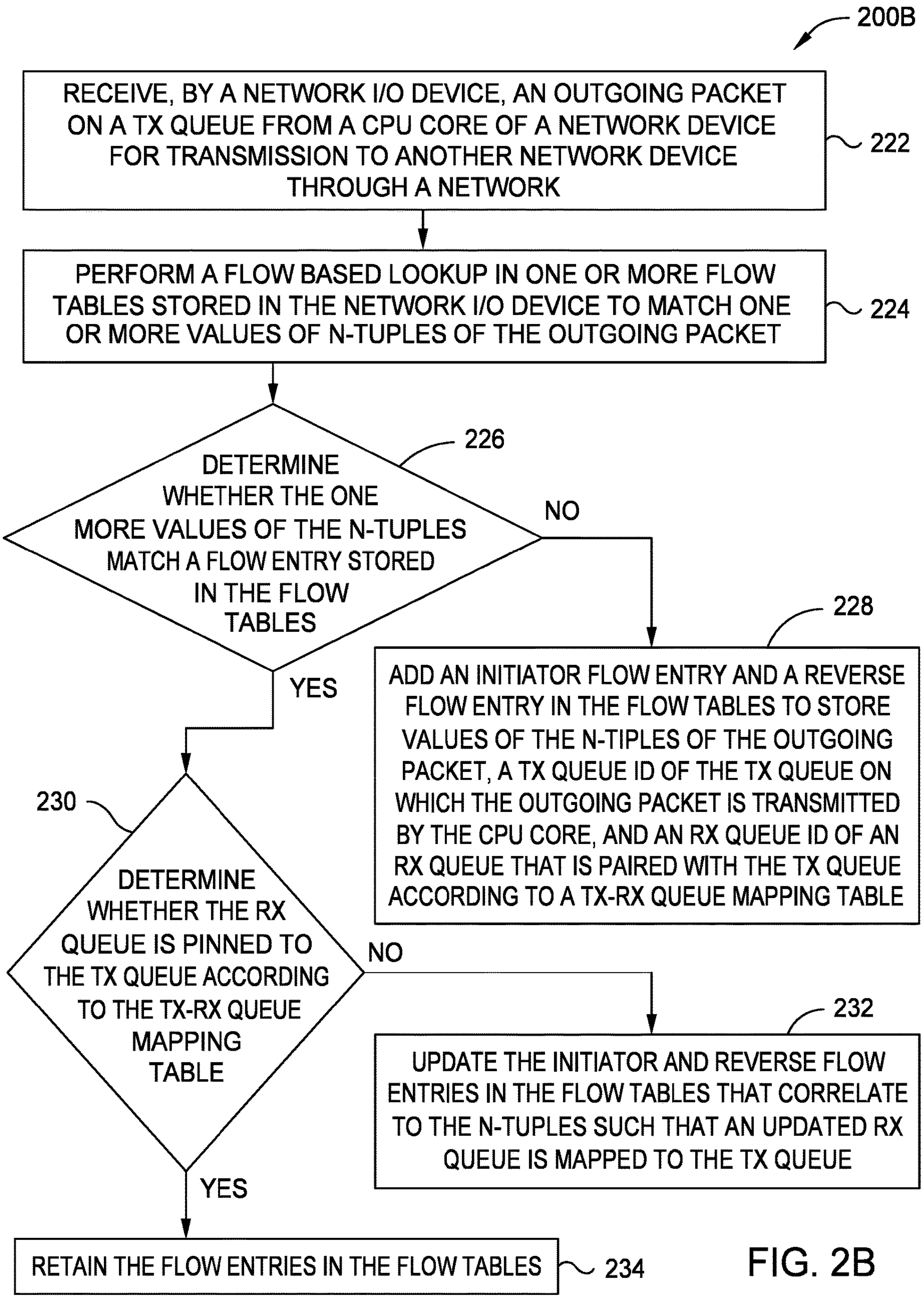

FIG. 2B illustrates a flow diagram of a method 200B performed by a network I/O device, in accordance with an embodiment of the present disclosure. At block 222, a network I/O device of a network device receives an outgoing (or outbound) packet on a TX queue from a CPU core of the network device for transmission to another network device through a network. At block 224, the network I/O device performs a flow based lookup in one or more flow tables stored in the network I/O device to match one or more values of N-tuples of the outgoing packet. At block 226, the network I/O device determines whether the one or more values of the N-tuples match a flow entry stored in the flow tables. At block 228, in response to a failure to find a matching flow entry in the flow tables, the network I/O device adds an initiator flow entry and a reverse flow entry in the flow tables to store values of the N-tuples of the outgoing packet, the TX queue ID of the TX queue on which the outgoing packet is transmitted by the CPU core, and an RX queue ID of an RX queue that is paired with (or mapped to) the TX queue according to a TX-Rx queue mapping table.

At block 230, in response to a matching flow entry being found in the flow tables, the network I/O device determines whether, in the flow entry, an RX queue is pinned to the TX queue on which the outgoing packet is transmitted by the CPU core according to the TX-RX queue mapping table. At block 232, in response to the RX queue not being pinned to the TX queue in the matching flow entry according to the TX-RX queue mapping table, the network I/O device updates the flow entries in the initiator and reverse flow tables such that an updated RX queue ID in the flow entries matches the TX queue ID of the TX queue on which the outgoing packet is transmitted by the CPU core. The network I/O device also updates the flow entries in the initiator and reverse flow tables such that the TX queue ID is updated to that of the TX queue on which the outgoing packet is transmitted by the CPU core. As a result, the initiator and reverse flow tables store the values of the N-tuples of both of the initiator and reverse flow packets, and the updated matching TX and RX queue IDs of the CPU core that is associated with the outgoing packet. At block 234, in response to the RX queue being pinned to the TX queue in the matching flow entry according to the TX-RX queue mapping table, the network I/O device retains the flow entries in the initiator and reverse flow tables without making any changes.

The methods 200A and 200B in FIGS. 2A and 2B are now further described by employing network devices 102, 104 and 108 of the environment 100 in the context of FIGS. 1A-1C, 3A-3B and 4. However, it should be understood that the methods 200A and 200B can be performed, for example, by any other suitable system, device, environment, software, and hardware, or a combination of systems, devices, environments, software, and hardware as appropriate. In some embodiments, various operations of the methods 200A and 200B can be run in parallel, in combination, in loops, or in any order. In some embodiments, the I/O device may be programmable and include a NIC, a DPU, a smartNIC, a DPU-based smartNIC, or any combination thereof.

As discussed above, the example environment 100 in FIG. 1A provides a high-level overview on how network packets can be transmitted from the network device 102 to the network device 108 through the network device 104 and back. In the following example, the network device 102 may be a user device, the network device 104 may be a load balancer, and the networks device 106-110 may be back-end servers of a server system.

As illustrated in FIG. 1A, the network device 102 transmits the packet 182 to the network device 104 through the network 103. In the present example, the packet 182 may include header fields that contain the following information:

Source IP address: 1.1.1.1,
Source Port: 1000,
Destination IP address: 2.2.2.2,
Destination Port: 2000,
where the network device 102 is the source device and the network device 104 is the destination device.

After the packet 182 is transmitted to the network device 104 from the network device 102, the network I/O device 114 may perform the method 200A in FIG. 2A.

At block 202, the network device 104 receives the incoming packet 182 from the network device 102 via the network 103. For example, the network I/O device 114 of the network device 104 receives the incoming packet 182 through one of the 1/O ports 117 (e.g., front panel port 0 or 1).

At block 204, the network I/O device 114 performs a flow based lookup in the flow tables 142 stored in the network I/O device 114 to match one or more values of N-tuples of the incoming packet 182. For example, the incoming packet 182 is received by the ingress pipeline circuitry 130 through the front panel 0 or 1. The parser circuitry 132 may parse the header fields of the incoming packet 182 and extract the values of the N-tuples of the packet 182. In one example, the N-tuples may include one or more of a source IP address, a source port, a destination IP address, a destination port, and a specific protocol in use. The lookup circuitry 134 may perform a flow based lookup in the flow tables 142 stored in the memory 140 to look for a matching flow entry based on the parsed values of the N-tuples (e.g., 5-tuples) of the incoming packet 182.

FIGS. 3A and 3B illustrate an example initiator flow table 142A and an example reverse flow table 142B, respectively, in accordance with embodiments of the present disclosure. As shown in FIG. 3A, the initiator flow table 142A includes multiple initiator flow entries each having multiple fields, such as initiator flow entry index, N-tuple values, TX queue ID, and RX queue ID. Similarly, the reverse flow table 142B in FIG. 3B includes multiple reverse flow entries having the same fields.

At block 204, the parser circuitry 132 may parse the header fields of the packet 182 to identify values of the N-tuples. The lookup circuitry 134 may perform a flow based lookup in the initiator flow table 142A and the reverse flow table 142B to look for a matching flow entry based on the values of the N-tuples of the incoming packet 182. In one embodiment, the lookup circuitry 134 may perform a flow based 5-tuple lookup to check whether the values of the source IP address, source port, destination IP address, destination port, and protocol of the packet 182 match a flow entry in the flow tables 142. In another embodiment, the lookup circuitry 134 may perform a flow based 4-tuple lookup to check whether the values of the source IP address, source port, destination IP address, and destination port of the packet 182 match a flow entry in the flow tables 142. In yet another embodiment, the lookup circuitry 134 may perform a flow based lookup using less than four-tuples (e.g., three-tuples, two-tuples, or one-tuple) to find a matching flow entry in the flow tables 142.

At block 206, the lookup circuitry 134 may determine whether the values of the N-tuples of the packet 182 match those stored in a flow entry in the flow tables 142. In the present example, it is assumed that the packet 182 is the first packet sent from the network device 102 to the network device 104. Hence, the lookup circuitry 134 determines that there is no flow entry stored in the flow tables 142 that matches the values of the N-tuples.

At block 210, in response to a failure to find a matching flow entry in the flow tables 142, the action circuitry 136 may perform a flow has (e.g., RSS) and steer the incoming packet 182 toward an RX queue of a CPU core of the network device 104 based on the hashing results. It should be noted that, at this stage, the network I/O device 114 does not add or update flow entries in the flow tables 142. Instead, the network I/O device 114 waits until the packet is processed by a CPU core and transmitted back to the network I/O device 114 on a TX queue of the CPU core before adding or updating flow entries in the flow tables based on the values of the N-tuples of the packet and the TX queue on which the packet is transmitted by the CPU core.

In the present example, after the packet 182 is received by the CPU core 0, VNF software (e.g., a load balancer service) executed on the CPU core 0 decides to send the packet to network device 108 (e.g., a back-end server) for processing. As a result, the CPU core 0 transmits an outgoing packet (e.g., the packet 184) on the TX0 to the network I/O device 114 through the host interface 113.

The packet 184 may include header fields that contain the following information:

Source IP address: 1.1.1.1,
Source Port: 1000,
Destination IP address: 3.3.3.3,
Destination Port: 3000,
where the network device 102 is the source device and the network device 108 is the destination device.

After the CPU core 0 transmits the outgoing packet 184 to the network I/O device 114, the network I/O device 114 may perform the method 200B in FIG. 2B.

At block 222, the network I/O device 114 receives the outgoing packet 184 from the CPU core 0 of the host CPU 112 through the host interface 113. For example, the outgoing packet 184 is received by the egress pipeline circuitry 120 of the network I/O device 114.

At block 224, the network I/O device 114 performs a flow based lookup in the flow tables 142 stored in the network I/O device 114 to match one or more values of N-tuples of the outgoing packet 184. For example, the parser circuitry 122 may parse the header fields of the outgoing packet 184 and extract the values of the N-tuples of the outgoing packet 184. In one example, the N-tuples may include one or more of a source IP address, a source port, a destination IP address, a destination port, and a specific protocol in use. The lookup circuitry 124 may perform a flow based lookup in the flow tables 142 to look for a matching flow entry based on the values of the N-tuples. The lookup operation performed by the lookup circuitry 124 at block 224 may be substantially similar to the lookup operation performed by the lookup circuitry 134 at block 204. Thus, the details of the lookup operation in block 224 are omitted for brevity.

At block 226, the lookup circuitry 134 may determine whether the values of the N-tuples match those stored in a flow entry stored in the flow tables 142. In the present example, it is assumed that the packet 184 is the first packet sent from the network device 102 to the network device 108 through the network device 104. Hence, the lookup circuitry 124 determines that there is no flow entry stored in the flow tables 142 that matches the values of the N-tuples.

At block 228, in response to a failure to find a matching flow entry in the flow tables 142, the action circuitry 126 may add a new initiator flow entry in the initiator flow table 142A and a new reverse flow entry in the reverse flow table 142B to store the values of the N-tuples of the outgoing packet 184, the TX queue ID (e.g., TX0) of the TX queue on which the packet 184 is transmitted from the CPU core 0, and an RX queue ID of the RX queue that is paired with (or mapped to) the TX queue according to a TX-Rx queue mapping table, such as the TX-RX queue mapping table 144 shown in FIG. 4. As a result of performing block 228, a new initiator flow entry 3008 is added to the initiator flow table 142A as shown in FIG. 3A. Also, a new reverse flow entry 3108 is added to the reverse flow table 142B as shown in FIG. 3B.

In the present example, as illustrated in FIG. 1A, after the packet 184 is serviced by the network device 108 (e.g., a back-end server), the network device 108 transmits a packet 186 back to the network device 104. The packet 186 may include header fields that contain the following information:

Source IP address: 3.3.3.3,
Source Port: 3000,
Destination IP address: 1.1.1.1,
Destination Port: 1000,
where the network device 108 is the source device and the network device 102 is the destination device.

After the packet 186 is transmitted to the network device 104 from the network device 108, the network I/O device 114 may perform the method 200A in FIG. 2A again.

At block 202, the network device 104 receives the incoming packet 186 from the network device 108 via the network 105. For example, the network I/O device 114 of the network device 104 receives the incoming packet 186 through one of the 1/O ports 117 (e.g., front panel port 0 or 1).

At block 204, the network I/O device 114 performs a flow based lookup in the flow tables 142 stored in the network I/O device 114 to match one or more values of N-tuples of the incoming packet 186. For example, the lookup circuitry 134 may perform a flow based lookup in the flow tables 142 stored in the memory 140 to look for a matching flow entry based on the parsed values of the N-tuples (e.g., 5-tuples) of the incoming packet 186.

At block 206, the lookup circuitry 134 determines whether the values of the N-tuples of the packet 186 match those stored in a flow entry in the flow tables 142.

In the present example, the packet 186 is the reverse flow of the packet 184. Thus, the lookup circuitry 134 determines that there is a flow entry stored in the flow tables 142 that matches the values of the N-tuples of the packet 186. For example, the reverse flow entry 3108 in the reverse flow table 142B includes the N-tuple values that match those of the packet 186. Hence, at block 208, the action circuitry 136 may steer the incoming packet 186 toward RX0 of the CPU core 0 based on the RX queue ID stored in the matching flow entry 3108 in the reverse flow table 142B.

In the present example, after the network device 104 receives the packet 186, the network device 104 (e.g., a load balancer) may decide to send the packet back to the network device 102. However, in the present example, it is assumed that, after the packet 184 was sent out from the CPU core 0, the CPU core 0 has been de-activated (or de-commissioned), and all the queues of the CPU core 0 have been forwarded to another CPU (e.g., the CPU core 1) of the host CPU 112. Thus, the packet 186 is serviced by VNF software executed on the CPU core 1 instead of CPU core 0. The CPU core 1 transmits an outgoing packet (e.g., the packet 188) on the TX1 to the network I/O device 114 through the host interface 113.

The packet 188 may include header fields that contain the following information:

Source IP address: 2.2.2.2,
Source Port: 2000,
Destination IP address: 1.1.1.1,
Destination Port: 1000,
where the network device 104 is the source device and the network device 102 is the destination device.

After the CPU core 1 transmits the outgoing packet 188 to the network I/O device 114, the network I/O device 114 may perform the method 200B in FIG. 2B again.

At block 222, the network I/O device 114 receives the outgoing packet 188 from the CPU core 1 of the host CPU 112 through the host interface 113. For example, the outgoing packet 188 is received by the egress pipeline circuitry 120 of the network I/O device 114.

At block 224, the network I/O device 114 performs a flow based lookup in the flow tables 142 stored in the network I/O device 114 to match one or more values of N-tuples of the outgoing packet 188. For example, the parser circuitry 122 may parse the header fields of the outgoing packet 184 and extract the values of the N-tuples of the outgoing packet 188. The lookup circuitry 124 may perform a flow based lookup in the flow tables 142 to look for a matching flow entry based on the values of the N-tuples.

At block 226, the lookup circuitry 124 determines whether the values of the N-tuples match those stored in a flow entry stored in the flow tables 142. In the present example, the packet 188 is the reverse flow of the packet 182. Thus, the lookup circuitry 124 may determine that reverse flow entry 3102 stored in the reverse flow table 142B matches the values of the N-tuples of the packet 188.

At block 230, in response to finding a matching flow entry in the flow tables 142, the lookup circuitry 124 may then determine whether the RX queue ID stored in the matching flow entry is the same as the RX queue that is mapped to the TX queue on which the packet 188 is transmitted according to the TX-RX queue mapping table 144.

As discussed above, in the present example, because the CPU core 0 was de-commissioned, the packet 186 was serviced by the CPU core 1 and transmitted back to the network I/O device 114 on TX1 of the CPU core 1.

While the reverse flow entry 3102 in FIG. 3B includes N-tuple values that match those of the packet 188, the RX queue ID in the flow entry 3102 is RX0. However, since the packet 188 is transmitted on TX queue 1, the RX queue ID paired with (or mapped to) TX1 is RX1 of the CPU core 1. Thus, the RX queue ID (e.g., RX0) stored in the matching flow entry 3102 is different from the RX queue ID that is mapped to the TX queue ID (e.g., RX1) of the TX queue on which the packet 188 is transmitted according to the TX-RX queue mapping table 144 shown in FIG. 4.

As a result, according to block 232, the action circuitry 126 may update both the reverse flow entry 3102 and the associated initiator flow entry 3002 so that the TX queue ID is overridden to reflect the TX queue ID (e.g., TX1) of the TX queue on which the packet 188 is received. The RX queue ID is also overridden to reflect the RX queue ID (e.g., RX1) of the RX queue that is paired with (or mapped to) the TX queue ID based on the TX-RX queue mapping table 144 shown in FIG. 4.

It is noted that, in a different example, the CPU core 0 is not de-activated or de-commissioned, the packet 186 is serviced by the CPU core 0 and transmitted back to the network I/O device 114 on TX0 of the CPU core 0. Since the packet 188 is the reverse flow of the packet 182, the lookup circuitry 124 may determine that reverse flow entry 3102 stored in the reverse flow table 142B matches the values of the N-tuples of the packet 188 according to block 226 in FIG. 2B. The lookup circuitry 124 may further determine whether the RX queue ID stored in the flow entry 3102 matches the RX queue ID mapped to the TX queue ID of the TX queue on which the packet 188 is transmitted, according to block 230. As shown in FIG. 3B, in the flow entry 3102, the stored RX queue ID is RX0. Since the packet 188 is transmitted on TX0 in this example, the stored RX queue ID (e.g., RX0) in the matching flow entry 3102 is the same as the RX queue ID that is mapped to the TX queue ID (e.g., TX0) of the TX queue on which the packet 188 is transmitted according to the TX-RX queue mapping table 144 shown in FIG. 4. As such, according to block 234, the action circuitry 126 may retain the flow entries 3002 and 3102 in the flow tables 142A and 142B without making any changes.

Unlike existing packet steering techniques (e.g., Receive Flow Steering (RFS)) that perform a hash lookup in a flow table maintained by the host CPU, the embodiments of the present disclosure install an initiator flow table and a reverse flow table in the network I/O device (e.g., in the NIC or DPU) to store entries for initiator flows and reverse flows. This offloads the flow table maintenance from the host CPU to the network I/O device, thereby saving computing and storage resources of the host CPU. Further, the network I/O device performs an N-tuple lookup without a need for hashing, and updates entries in the flow tables without requiring any extra communication with the host CPU. The embodiments of the present disclosure ensure that the associated RX and TX packets are processed by the same CPU core even when NAT (or NAPT) and CPU core decommission happen in the host CPU.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method performed by a network Input/Output (I/O) device, the method comprising:

when an outgoing packet is transmitted on a transmit (TX) queue by a central processing unit (CPU) core to the network I/O device, performing a flow-based lookup in at least one of an initiator flow table and a reverse flow table stored in the network I/O device to match one or more values of N-tuples of the outgoing packet;

in response to the one or more values of the N-tuples of the outgoing packet matching a flow entry in the initiator flow table or the reverse flow table, determining whether a receive (RX) queue ID stored in the flow entry is pinned to a TX queue ID of the TX queue on which the outgoing packet is transmitted; and in response to the RX queue ID not being pinned to the TX queue ID, updating the RX queue ID and the TX queue ID in the initiator flow table and the reverse flow table such that the updated RX queue ID is pinned to the TX queue ID of the TX queue on which the outgoing packet is transmitted by the CPU core.

2. The method of claim 1, wherein:

in response to the one or more values of the N-tuples of the outgoing packet not matching a flow entry in the initiator flow table and the reverse flow table, adding a new flow entry to the initiator flow table and a new flow entry to the reverse flow table to store the one or more values of the N-tuples of the outgoing packet, a TX queue ID of the TX queue on which the outgoing packet is transmitted, and an RX queue ID that is mapped to the TX queue ID based on a TX-RX queue mapping table.

3. The method of claim 1, wherein:

in response to the RX queue ID being pinned to the TX queue ID, retaining the RX queue ID and the TX queue ID in the initiator flow table and the reverse flow table.

4. The method of claim 1, further comprising:

when an incoming packet is received by the network I/O device on a front panel port, performing another flow-based lookup in at least one of the initiator flow table and the reverse flow table to match one or more values of N-tuples of the incoming packet.

5. The method of claim 4, further comprising:

in response to the one or more values of the N-tuples of the incoming packet matching a flow entry in the initiator flow table or the reverse flow table, steering the incoming packet toward an RX queue of a CPU core according to an RX queue ID stored in the flow entry.

6. The method of claim 4, further comprising:

in response to the one or more values of the N-tuples of the incoming packet not matching a flow entry in the initiator flow table and the reverse flow table, steering the incoming packet toward an RX queue of a CPU core based on a flow hash.

7. A programmable network input/output (I/O) device comprising:

circuitry configured to:

when an outgoing packet is transmitted on a transmit (TX) queue by a central processing unit (CPU) core to the programmable network I/O device, perform a flow-based lookup in at least one of an initiator flow table and a reverse flow table stored in the programmable network I/O device to match one or more values of N-tuples of the outgoing packet;

in response to the one or more values of the N-tuples of the outgoing packet matching a flow entry in the initiator flow table or the reverse flow table, determine whether a receive (RX) queue ID stored in the flow entry is pinned to a TX queue ID of the TX queue on which the outgoing packet is transmitted; and in response to the RX queue ID not being pinned to the TX queue ID, update the RX queue ID and the TX queue ID in the initiator flow table and the reverse flow table such that the updated RX queue ID is pinned to the TX queue ID of the TX queue on which the outgoing packet is transmitted by the CPU core.

8. The programmable network I/O device of claim 7, wherein the circuitry is configured to:

in response to the one or more values of the N-tuples of the outgoing packet not matching a flow entry in the initiator flow table and the reverse flow table, add a new flow entry to the initiator flow table and a new flow entry to the reverse flow table to store the one or more values of the N-tuples of the outgoing packet, a TX queue ID of the TX queue on which the outgoing packet is transmitted, and an RX queue ID that is mapped to the TX queue ID based on a TX-RX queue mapping table.

9. The programmable network I/O device of claim 7, wherein the circuitry is configured to:

in response to the RX queue ID being pinned to the TX queue ID, retain the RX queue ID and the TX queue ID in the initiator flow table and the reverse flow table.

10. The programmable network I/O device of claim 7, wherein the circuitry is configured to:

when an incoming packet is received by the programmable network I/O device on a front panel port, perform another flow-based lookup in at least one of the initiator flow table and the reverse flow table to match one or more values of N-tuples of the incoming packet.

11. The programmable network I/O device of claim 10, wherein the circuitry is configured to:

in response to the one or more values of the N-tuples of the incoming packet matching a flow entry in the initiator flow table or the reverse flow table, steer the incoming packet toward an RX queue of a CPU core according to an RX queue ID stored in the flow entry.

12. The programmable network I/O device of claim 10, wherein the circuitry is configured to:

in response to the one or more values of the N-tuples of the incoming packet not matching a flow entry in the initiator flow table and the reverse flow table, steer the incoming packet toward an RX queue of a CPU core based on a flow hash.

13. The programmable network I/O device of claim 7, wherein the programmable network I/O device comprises at least one of a network interface card (NIC) or a data processing unit (DPU).

14. A network device comprising:

a host CPU comprising a plurality of CPU cores; and a network input/output (I/O) device communicatively coupled to the host CPU through a host interface, the network I/O device comprising circuitry configured to:

when an outgoing packet is transmitted on a transmit (TX) queue by a central processing unit (CPU) core to the network I/O device, perform a flow-based lookup in at least one of an initiator flow table and a reverse flow table stored in the network I/O device to match one or more values of N-tuples of the outgoing packet;

in response to the one or more values of the N-tuples of the outgoing packet matching a flow entry in the initiator flow table or the reverse flow table, determine whether a receive (RX) queue ID stored in the flow entry is pinned to a TX queue ID of the TX queue on which the outgoing packet is transmitted; and in response to the RX queue ID not being pinned to the TX queue ID, update the RX queue ID and the TX queue ID in the initiator flow table and the reverse flow table such that the updated RX queue ID is pinned to the TX queue ID of the TX queue on which the outgoing packet is transmitted by the CPU core.

15. The network device of claim 14, wherein the circuitry is configured to:

in response to the one or more values of the N-tuples of the outgoing packet not matching a flow entry in the initiator flow table and the reverse flow table, add a new flow entry to the initiator flow table and a new flow entry to the reverse flow table to store the one or more values of the N-tuples of the outgoing packet, a TX queue ID of the TX queue on which the outgoing packet is transmitted, and an RX queue ID that is mapped to the TX queue ID based on a TX-RX queue mapping table.

16. The network device of claim 14, wherein the circuitry is configured to:

in response to the RX queue ID being pinned to the TX queue ID, retain the RX queue ID and the TX queue ID in the initiator flow table and the reverse flow table.

17. The network device of claim 14, wherein the circuitry is configured to:

when an incoming packet is received by the network I/O device on a front panel port, perform another flow-based lookup in at least one of the initiator flow table and the reverse flow table to match one or more values of N-tuples of the incoming packet.

18. The network device of claim 17, wherein the circuitry is configured to:

in response to the one or more values of the N-tuples of the incoming packet matching a flow entry in the initiator flow table or the reverse flow table, steer the incoming packet toward an RX queue of a CPU core according to an RX queue ID stored in the flow entry.

19. The network device of claim 17, wherein the circuitry is configured to:

in response to the one or more values of the N-tuples of the incoming packet not matching a flow entry in the initiator flow table and the reverse flow table, steer the incoming packet toward an RX queue of a CPU core based on a flow hash.

20. The network device of claim 14, wherein at least one of the plurality of CPU cores is configured to execute instructions to perform a virtual network function.

* * * * *